S. LANG.
Machine for Striping Broom-Handles.

No. 215,137. Patented May 6, 1879.

UNITED STATES PATENT OFFICE.

SOLOMON LANG, OF SCHENECTADY, NEW YORK.

IMPROVEMENT IN MACHINES FOR STRIPING BROOM-HANDLES.

Specification forming part of Letters Patent No. 215,137, dated May 6, 1879; application filed January 21, 1879.

*To all whom it may concern:*

Be it known that I, SOLOMON LANG, of Schenectady, in the county of Schenectady and State of New York, have invented a new and Improved Machine for Striping Broom-Handles, of which the following is a specification.

My invention relates to a machine for laying bands or stripes of color around broom-handles, whereby the work can be done more rapidly and neatly than heretofore; and consists in certain novel features of construction and combinations, as will be set forth more particularly hereinafter.

Figure 1:
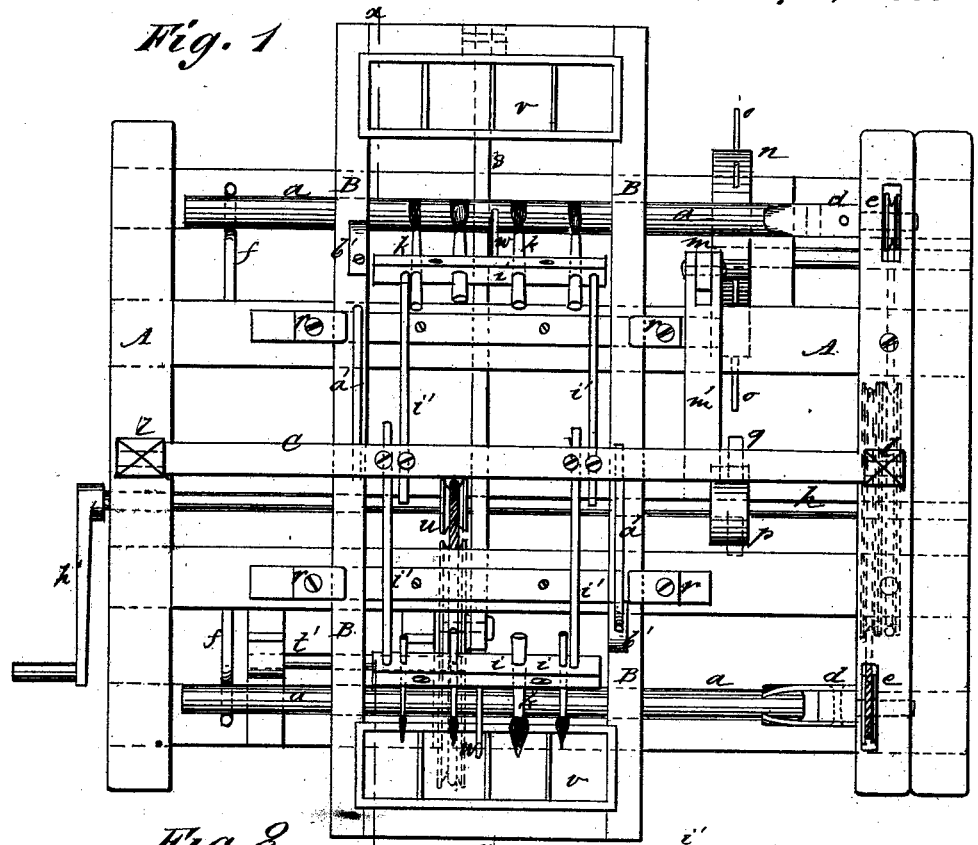
Figure 2:
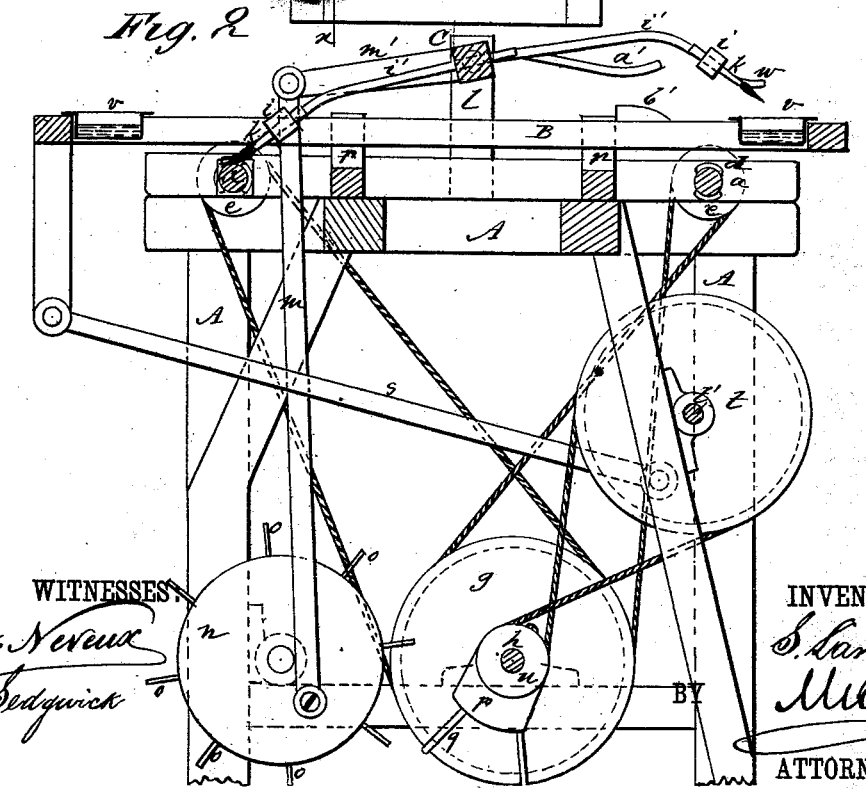

In the accompanying drawings, Figure 1 is a general plan of my improved machine. Fig. 2 is a sectional elevation on the line $x$ $x$ of Fig. 1.

Similar letters of reference indicate corresponding parts.

The operative parts of the machine are mounted upon a suitable frame, and fitted to carry two handles and two sets of striping-brushes, that act alternately, so that while one handle is being striped by one set of brushes, the other handle can be removed and a new one put in place.

A is the frame of the machine. Upon the top and at each side of the machine are fitted pulleys $e$ $e$ upon short arbors, to which are attached spring-holding fingers $d$, forming a spring-chuck at each side of the machine, adapted for holding one end of the handles $a$. The opposite end of each handle $a$ rests upon a loop, $f$, projecting from the frame of the machine.

The pulleys $e$, and consequently handles $a$, are revolved continuously by a belt or cord from pulleys $g$ $g$ on the shaft $h$, which is the main driving-shaft of the machine, and will be operated by hand by means of crank $h'$, or by steam or horse power.

The striping of the handles is done by means of brushes $k$ while the handles $a$ are revolving, the brushes being held in contact with the handles.

Each set of brushes is carried by a head-block, $i$, connected by arms $i'$ to a rock bar or shaft, C, which is journaled in standards $l$ $l$ at the top of frame A.

Upon a short shaft that is fitted in the lower part of frame A is a wheel, $n$, and connected therewith by a crank-pin is a rod, $m$, that passes upward, and is connected to an arm, $m'$, from rock-bar C.

Upon the main shaft $h$ is a block, $p$, that has two radial tappets, $q$, which act by contact with the radial pins $o$ of wheel $n$, to give wheel $n$ a quarter-revolution at every revolution of shaft $h$, thereby rocking shaft C and bringing the sets of brushes alternately in contact with the handles $a$. The size of pulleys $e$ being small in comparison with the wheels $g$, the handles will revolve rapidly and make several revolutions during the contact of the brushes.

Upon the upper part of frame A, beneath shaft C, is a rectangular frame, B, fitted horizontally in ways $r$, so as to be capable of oscillating motion that is imparted to it by a pitman, $s$, and crank-wheel $t$ on a counter-shaft, $t'$, operated by a belt or gear from main shaft $h$. I have shown a pulley, $u$, and belt connecting to $t$.

At each end of frame B are paint-holders $v$, divided into compartments for the various colors. The brushes $k$ vary in size according to the width of stripe desired, and there may be any suitable number of brushes.

The machine operates as follows: The block $p$ first acts upon wheel $n$ to rock shaft C in one direction, and bring one set of brushes partially down, so that they enter the paint-holders $v$, the frame B being at that moment in a position where the paint-holders will receive the brushes. At the next revolution of shaft $h$ wheel $n$ is still further moved, and the brushes descend upon the handle $a$ at that side, the paint-holders having meanwhile moved outward from beneath the brushes. The handles, revolving rapidly against the brushes, are striped, while at the opposite side of the machine a handle may be inserted into the chuck.

The next motion given to wheel $n$ raises the brushes from the handle and lowers the brushes at the other side into the paint-holders at the other end of the frame, the operation continuing at that side, as described. The completed handle will be removed at one side and a new handle substituted while the handle at the other side is being striped.

In the head-block $i$, that carries the brushes, is a piece, $w$, of spring-wire, the end of which will bear upon the handle and prevent the brushes descending too far. This wire $w$ is especially useful in painting sprung or crooked handles, as it will raise the brushes when the bend in the handle comes around, and prevent the brushes spreading more paint on one side than the other.

To each side of shaft C an arm, $a'$, is connected, and bent downward, so that its outer end is in a position to be acted upon by a projection, $b'$, on the side of frame B, so as to raise the brushes from the paint-holders at the moment frame B moves outward, and just before the brushes are pressed down upon the handles, as before described. This prevents contact of the brushes with the sides of the paint-holders, and consequent waste of material.

The machine described will perform the work of striping handles neatly, rapidly, and cheaply. Little power is required, and but a small amount of paint used. The double-acting feature prevents delay in the work while the handles are being changed.

Having thus described my invention, I claim as new and desire to secure by Letters Patent—

1. In a machine for striping broom-handles, the combination of the rocking shaft C, carrying the head-blocks $i$ and the brushes, the oscillating frame B, carrying paint-holders $v$, the revolving chucks $d$ for the handles, and connecting mechanism, arranged for operation substantially as described and shown.

2. In a machine for striping broom-handles, the oscillating frame B, carrying paint-holders $v$, in combination with the striping-brushes, carried by the rock-shaft, as described.

3. The brush-holding blocks $i$, provided with the wire arms $w$, as and for the purpose set forth.

4. The combination, with the vibrating brush-blocks $i$, oscillating frame B, and paint-holders $v$, of the wire arms $a'$, and projections $b$ and connecting mechanism, substantially as and for the purposes set forth.

SOLOMON LANG.

Witnesses:
  JOHN F. LANG,
  THOMAS B. THORNTON.